Oct. 5, 1965  G. H. YELINEK  3,209,917
FILTER CARTRIDGE
Original Filed May 11, 1962
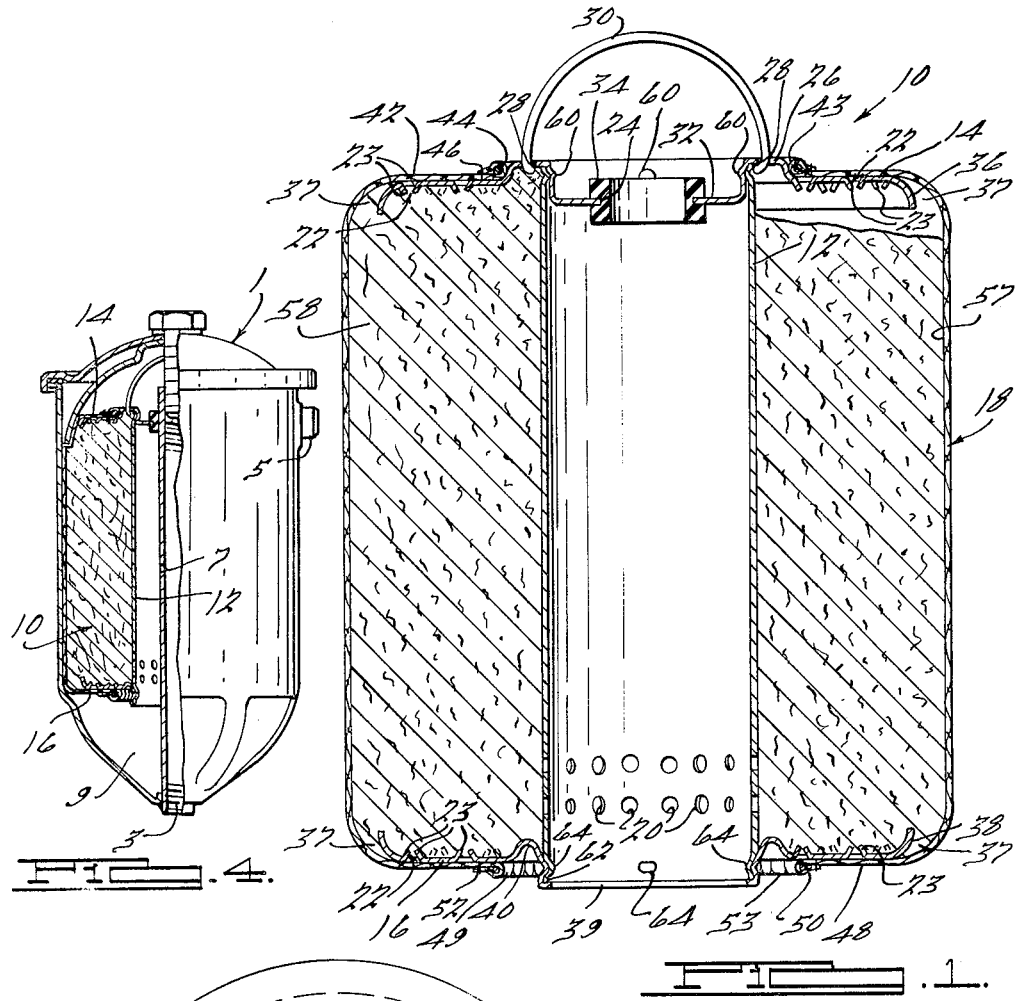
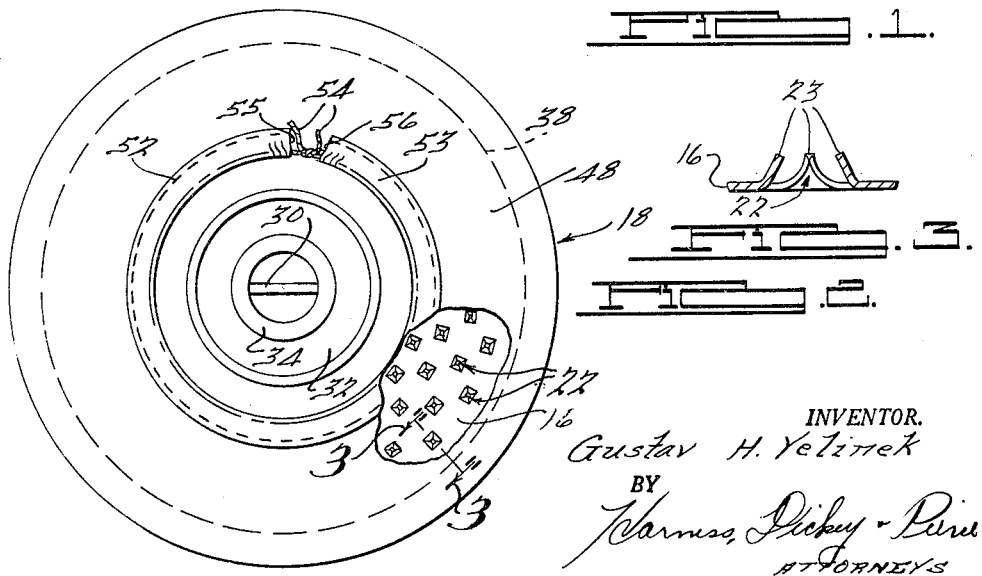
INVENTOR.
Gustav H. Yelinek
BY
Harness, Dickey & Pierce
ATTORNEYS United States Patent Office 3,209,917
Patented Oct. 5, 1965

3,209,917
FILTER CARTRIDGE
Gustav H. Yelinek, Racine, Wis., assignor to Walker Manufacturing Company, a corporation of Delaware
Continuation of application Ser. No. 193,928, May 11, 1962. This application Dec. 21, 1964, Ser. No. 419,632
7 Claims. (Cl. 210—484)

This application is a continuation of my co-pending application entitled Filter Cartridge, Serial Number 193,928, dated May 11, 1962, now abandoned.

The present invention relates to filter cartridges and particularly relates to a socket-type of disposable cartridge used for filtering the lubricating oil of internal combustion engines and the like. Though not necessarily so restricted, the invention is especially adapted for use in oil filters of the type shown in U.S. Patent No. 2,168,124 and includes various improvements upon the cartridge shown in this patent.

The main objects of the invention are to provide a filter cartridge of such construction that it has an improved performance, can be mass produced at reduced cost by automatic machinery with a minimum human element and deviation from specifications, has an improved seal and pull-out structure, permits media density control, and which has a pleasing appearance.

Further objects, advantages, and features of the invention will become apparent from the following description taken in conjunction with the drawings wherein:

FIGURE 1 is a longitudinal sectional view of the cartridge;

FIG. 2 is a bottom view of the cartridge;

FIG. 3 is a sectional vew of a perforation taken along the line 3—3 of FIG. 2 in the direction of the arrows; and FIG. 4 is a reduced view showing the cartridge installed in a bypass filter of the type shown in U.S. Patent No. 2,168,124.

In the drawings, the filter 1 has an oil inlet pipe 3 and an outlet 5. Oil leaving the inlet pipe 3 through metering orifice 7 can flow into the sump 9 but to reach the outlet 5 it must flow through substantially the length of cartridge 10 which forms the subject matter of this invention.

The filter cartridge 10 comprises a center tube 12, which is larger in diameter than inlet pipe 3, a top end plate 14, a bottom end plate 16, and a socket 18 of open weave construction.

For use in the filter illustrated, the center tube 12 may be imperforate or may be provided at its bottom end with about 2–3 rows of perforations 20. The tube may be formed by first providing perforations 20 in a flat metal sheet and then rolling the sheet into a tube and lock-seaming it in a well known manner.

The end plates 14 and 16 are conveniently made by a stamping and forming operation which imparts the proper shape and dimensions thereto while simultaneously punching the perforations 22 therein. The perforations form the relatively sharp projections 23 as shown in FIG. 3 which extend into the filter material to hold it in place place and prevent migration. The top end plate 14 is further formed with a centrally located aperture 24 and a raised circular portion 26 which is provided with apertures 28 for receiving the ends of the bail 30. The central region 32 of the end plate is depressed to allow sufficient axial room for the specially shaped annular rubber sealing grommet 34 that is held by the inner periphery of the plate section 32 and which sealingly engages the outside of pipe 3. The outer peripheral portions 36 and 38 of plates 14 and 16 respectively, are curved inwardly along a radius to prevent the edges thereof from cutting into the sock 18 and to provide the annular cavities 37 which are filled with filtering material during the manufacture of the cartridge and assist in obtaining the proper dimensions of the cartridge without requiring the sock to bear against edge portions of the caps. Cavities 37 when filled with the filtering material allow the sock to bear tightly against the material along the entire length of its side portions.

The sock 18 is made of any suitable material such as fine wire screen of fabric which while open weaved to provide resilience and low flow resistance is sufficiently close weaved to provide a barrier against migration of any of the filter material. The upper end 42 of the sock is provided with a circular aperture 43 of definite diameter at its central portion and the end portions of the sock are lapped over a supporting ring 44 of any suitable material, such as wire or heavy cord, and sewn or otherwise secured at 46 to lock the ring 44 therein. Ring 44 maintains the shape of aperture 43 so that the end 42 of the sock may be properly positioned on cap 14 around the shoulder 26. The lower end 48 of the sock is provided with a centrally located variable aperture 49 since the end portions of the sock adjacent thereto are lapped over a flexible string or wire draw member 50 and sewn together at 52 to provide an annular tube 53 slidably containing the drawstring 50. The ends 54 of member 50, as shown in FIG. 2, extend through the ends 55 and 56 of tube 53 so that the ends of member 50 may be pulled to reduce the diameter of aperture 49 to draw the sock ends 42 and 48 tightly against the end caps 14 and 16 and the side portions 57 of the sock tightly against the filtering material 58 surrounding the tube 12. The sock 18 completely cover the inlet perforations in bottom cap 16 and the outlet perforations in the top cap 14 and thereby completely eliminates the possibility of migration of the filter material 58.

The filter material 58 may be any desired filter material or blend of materials, depending upon the fluid being filtered, the quality of filtration desired, and the flow rate required. By changing the density and media it is also possible to convert a bypass filter, as shown, to a full flow filter.

In the operation of the filter, the oil is passed from the oil pump, enters the inlet pipe 3 and flows out through the orifice 7 to fill the center tube 12 and the filter sump. It enters the cartridge 10 through holes 20 or perforations 22 in the bottom end cap and flows the length of the cartridge and leaves it through the perforations 22 in the top end cap to flow to the outlet pipe 67.

It is readily seen that the structure of the cartridge is quite simple and well adapted for manufacture by automatic machinery. To illustrate one manufacturing procedure, the perforated top end cap 14 is secured by staking at 60 to the rolled center tube 12, and the ring 44 with sock end 42 attached thereto, is positioned around the raised portion 26. With the bottom end 48 of the sock expanded before the drawstring 50 in tube 53 is pulled tight, the assembled top cap, tube and sock are then placed in a cylindrical fixture. Onto a ram above the fixture the bottom end cap is positioned. A definite amount of filtering material is fed into the fixture and the ram compresses it to a predetermined density and forces the entire unit into a second cylinder during which the sock is drawn over the outside of the filtering material. The end of the sock over the bottom end cap is tied up, the ram retracks the cartridge is removed from the fixture, and the center tube and bottom end cap are secured by staking, the groove 68 providing room for the staking tool. The wire handle 30 is installed and the grommet 34 inserted in the top end cap.

Modifications may be made in the structure shown without departing from the spirit and scope of the invention and the cartridge 10 may be modified to adapt it for use in other types of filters than the one illustrated.

What is claimed is:

1. An axial flow filter cartridge for insertion into a substantially cylindrical filter housing comprising a cylindrical center tube, a pair of end caps disposed one at each end of said center tube, one of said end caps being formed with a plurality of inlet ports, the other of said end caps being formed with a plurality of outlet ports, a flexible sock element extending between said end caps and having end sections overlying said inlet and said outlet ports, and a filtering media contained between said sock element, said end caps and said center tube, at least a portion of said filtering media being disposed between said sock element and the outer peripheries of said end caps for preventing said sock element from bearing directly upon said outer peripheries of said end caps and giving the filter cartridge dimensional flexibility in a radial direction to facilitate insertion thereof in the filter housing.

2. An axial flow filter cartridge as set forth in claim 1 wherein the inlet and outlet ports are defined by a plurality of inwardly extending projections and wherein said projections and said end sections of said sock element function to preclude the migration of said filtering media through said ports.

3. An axial flow filtering cartridge comprising a perforated center tube secured to end caps each having a centrally located aperture and perforations located radially outwardly therefrom, said perforations in one of said end caps comprising inlet ports and said perforations in the other of said end caps comprising outlet ports, one of said caps having a circular raised portion intermediate the aperture and perforations therein, an open weave sock having an apertured end fitting around said raised portion and positioned thereby on said one cap, the other end of said sock being drawn over the other end cap by a draw string to overlie the perforations in the cap while leaving the centrally located apertture therein open, and fibrous filtering material packed to a predetermined density in the cavity formed by said sock, caps, and center tube.

4. A filtering cartridge adapted to be inserted into a filter housing having a generally cylindrical shape comprising a center tube, a pair of end caps each having a centrally located aperture therein, one of said end caps being formed with a plurality of inlet ports and the other of said end caps being formed with a plurality of outlet ports, said inlet and outlet ports forming inwardly extending projections, the peripheral portions of said caps being curved inwardly, an open weave sock element having its ends overlying said inlet and outlet ports in said end caps and having its side portions extending from one end cap to the other to provide a filtering cavity defined by said center tube, said end caps and said sock, at least one of the ends of said sock element being spaced radially outwardly from said peripheral portions to give the filter cartridge dimensional flexibility in the radial direction for insertion into the filter housing, and filtering material packed in said cavity and engaged by said projections and said peripheral portions to prevent excessive settling of the filtering material.

5. An axial flow filter cartridge adapted to be inserted into a substantially cylindrical filter housing comprising a center tube, a pair of end caps fixed relative to said center tube at each end thereof, one of said end caps being provided with a plurality of inlet ports around said center tube, the other of said end caps being formed with a plurality of outlet ports around said center tube, a flexible sock element extending along said center tube at a spaced distance therefrom to provide an annular filter cavity, said sock element having end sections extending across said inlet and outlet ports to define the ends of said annular filter cavity with said end caps, at least one of said end caps terminating at its outer extremity inwardly of said sock element and being deformed into said filter cavity away from the adjacent end section of said sock element, and a filtering media contained within said annular filter cavity, a portion of said filtering media being contained within the area between said outer extremity of said one end cap and the adjacent end section of said sock for supporting said sock in the area of said outer extremity for compression of the respective edge of said cartridge upon insertion of the filter housing.

6. An axial flow filter cartridge adapted to be inserted into a generally cylindrical filter housing comprising a center tube, a pair of end caps fixed relative to said center tube at each end thereof, a plurality of inlet ports formed in one of said end caps around said center tube and a plurality of outlet ports formed in the other of said end caps around said center tube, each of said ports being formed by a plurality of in-turned projections, a flexible sock element extending along said center tube at a spaced distance therefrom to provide an annular filter cavity, said sock element further having end sections extending across said inlet and outlet ports on the side of said end sections opposite to said projections to define the ends of said annular filter cavity with said end caps, at least one of said end caps terminating at its outer extremity inwardly of said sock element and being deformed into the filter cavity away from the adjacent end section of said sock element, and a filtering media contained within said filter cavity and engaged by said projections to prevent excess settling of said filtering media, a portion of said filtering media being contained within the area between said outer extremity of said one end cap and the adjacent end section of said sock for supporting said sock in the area of said outer extremity for compression of the respective edge of said filter cartridge upon insertion into the filter housing.

7. A filter cartridge as set forth in claim 6 wherein the inlet and outlet ports are square and are defined by at least four projections.

References Cited by the Examiner

UNITED STATES PATENTS

| 2,522,975 | 9/50 | Voorhees | 210—457 |
| 2,543,481 | 2/51 | Wicks et al. | 210—458 |
| 2,656,929 | 10/53 | Dolan | 210—457 |
| 3,076,553 | 2/63 | Yelinek | 210—484 X |

FOREIGN PATENTS 496,656  7/54  Italy.

REUBEN FRIEDMAN, *Primary Examiner.*